(12) United States Patent
Lavian et al.

(10) Patent No.: US 7,710,871 B2
(45) Date of Patent: May 4, 2010

(54) DYNAMIC ASSIGNMENT OF TRAFFIC CLASSES TO A PRIORITY QUEUE IN A PACKET FORWARDING DEVICE

(75) Inventors: Tal I. Lavian, Sunnyvale, CA (US); Stephen Lau, Milpitas, CA (US)

(73) Assignee: Nortel Networks Limited, St. Laurent Quebec (CA)

( * ) Notice: Subject to any disclaimer, the term of this patent is extended or adjusted under 35 U.S.C. 154(b) by 1879 days.

(21) Appl. No.: 10/685,947

(22) Filed: Oct. 15, 2003

(65) Prior Publication Data

US 2004/0076161 A1    Apr. 22, 2004

Related U.S. Application Data

(63) Continuation of application No. 09/227,389, filed on Jan. 8, 1999, now abandoned.

(51) Int. Cl.
*H04L 12/26* (2006.01)
(52) U.S. Cl. .................. 370/230; 370/229; 370/230.1; 370/231; 370/232; 370/233; 370/234; 370/235; 370/428; 370/429
(58) Field of Classification Search ......... 370/229–235, 370/428, 429
See application file for complete search history.

(56) References Cited

U.S. PATENT DOCUMENTS

| | | | | |
|---|---|---|---|---|
| 5,504,744 A | * | 4/1996 | Adams et al. ............... | 370/232 |
| 5,563,874 A | * | 10/1996 | Kant .......................... | 370/252 |
| 5,790,554 A | * | 8/1998 | Pitcher et al. ............... | 370/471 |
| 5,862,338 A | | 1/1999 | Walker et al. | |
| 5,909,686 A | | 6/1999 | Muller et al. | |
| 6,094,434 A | | 7/2000 | Kotzur et al. | |
| 6,104,700 A | | 8/2000 | Haddock et al. | |
| 6,144,636 A | * | 11/2000 | Aimoto et al. .............. | 370/229 |
| 6,167,445 A | | 12/2000 | Gai et al. | |
| 6,169,728 B1 | | 1/2001 | Perreault et al. | |
| 6,304,551 B1 | * | 10/2001 | Ramamurthy et al. ....... | 370/232 |
| 6,345,038 B1 | | 2/2002 | Selinger | |

(Continued)

FOREIGN PATENT DOCUMENTS

EP           082979 A       10/1998

(Continued)

OTHER PUBLICATIONS

Tennenhouse, D. L. et al: "A Survey of Active Network Research," IEEE Communications Magazine, US. IEEE Service Center. Piscataway, NJ, vol. 35, No. 1, Jan. 1, 1997, pp. 80-86.

*Primary Examiner*—William Trost, IV
*Assistant Examiner*—Toan D Nguyen
(74) *Attorney, Agent, or Firm*—Blakely, Sokoloff, Taylor & Zafman LLP

(57) ABSTRACT

An apparatus and method for dynamic assignment of classes of traffic to a priority queue. Bandwidth consumption by one or more types of packet traffic received in the packet forwarding device is monitored to determine whether the bandwidth consumption exceeds a threshold. If the bandwidth consumption exceeds the threshold, assignment of at least one type of packet traffic of the one or more types of packet traffic is changed from a queue having a first priority to a queue having a second priority.

23 Claims, 6 Drawing Sheets

U.S. PATENT DOCUMENTS

| | | | |
|---|---|---|---|
| 6,373,841 B1 * | 4/2002 | Goh et al. | 370/389 |
| 6,424,624 B1 | 7/2002 | Galand et al. | |
| 6,438,106 B1 | 8/2002 | Pillar et al. | |
| 6,643,258 B1 * | 11/2003 | Ise et al. | 370/230 |

FOREIGN PATENT DOCUMENTS

| | | |
|---|---|---|
| WO | WO 99/00949 | 1/1999 |

* cited by examiner

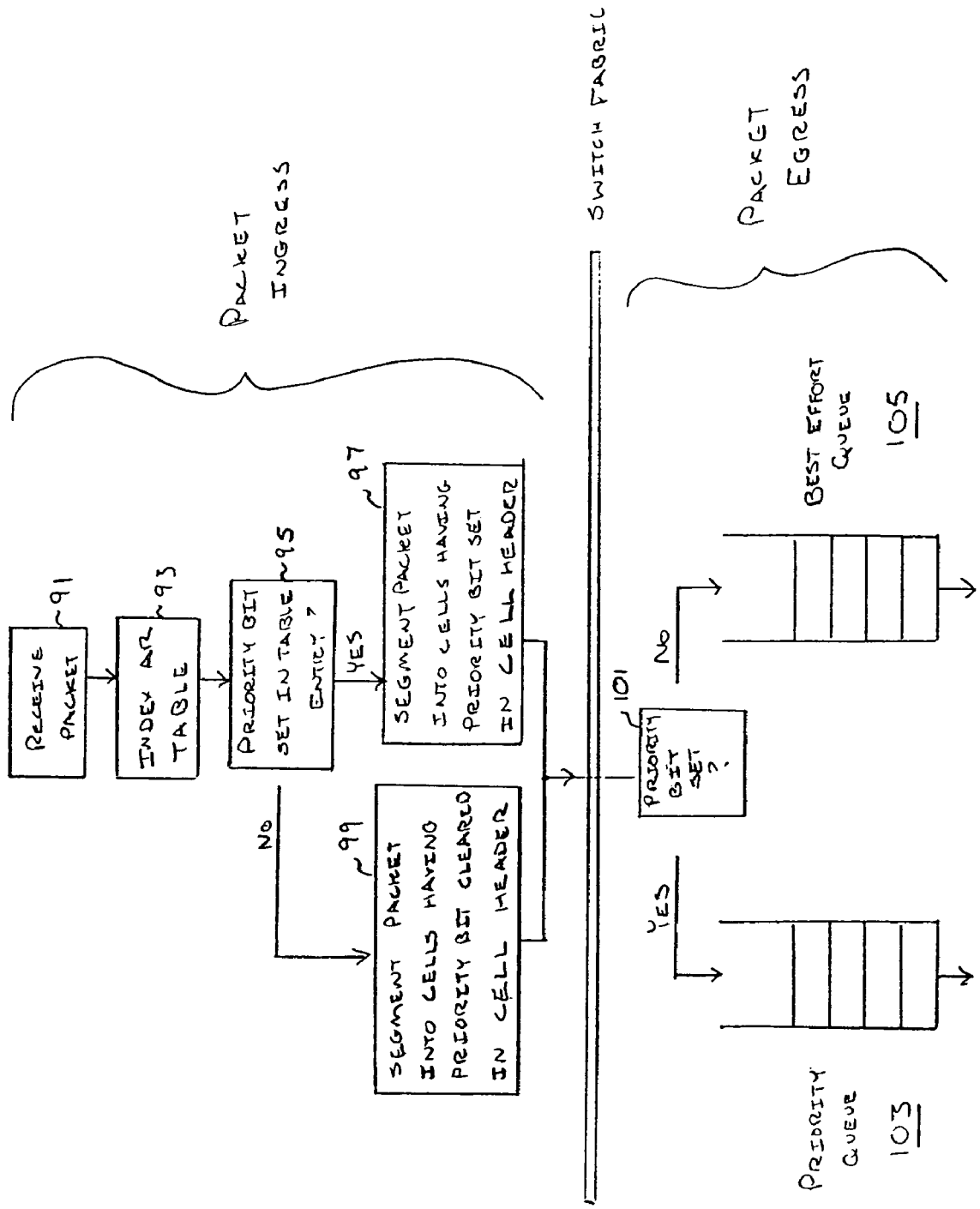

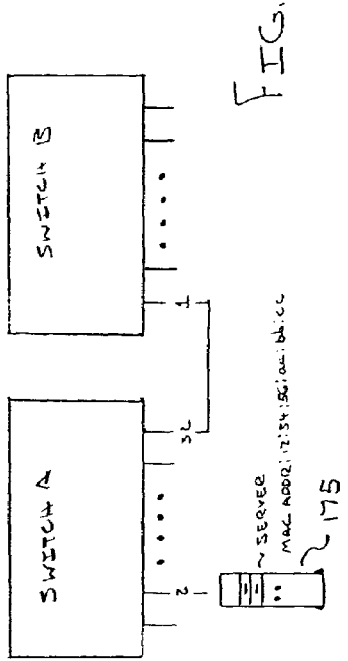

FIG. 6

```
MONITOR:
    FOREVER
    {
        READ_DEST_MAC_UTIL% (PORT1, MAC ADDR A)
        READ_DEST_MAC_UTIL% (PORT1, MAC ADDR B)
        DELAY 10MS
    }
```
~ 178

```
POLICY ENFORCEMENT:
    A%: LINE UTILIZATION % MAC ADDR A
    B%: LINE UTILIZATION % MAC ADDR B
    QA_S: QUEUE ASSIGNMENT OF SERVER MAC ADDR TRAFFIC
    QA_A: QUEUE ASSIGNMENT OF MAC ADDR A TRAFFIC
    QA_B: QUEUE ASSIGNMENT OF MAC ADDR B TRAFFIC
    DELTA = 5%
    QA_S = QA_A = QA_B = PRI. Q
    FOREVER
    {
        GET A%, B% FROM MONITOR
181-    IF (QA_A == PRI. Q AND QA_B == PRI. Q) AND
            ((A%+B%) >80%)
            QA_A = B.E. Q
183-    IF (QA_A == B.E. Q AND QA_B == PRI. Q) AND
            ((A%+B%) < (80% - DELTA))
            QA_A = PRI. Q
185-    IF (QA_A == B.E. Q AND QA_B == PRI. Q) AND
            (B% >80%)
            QA_B = B.E. Q
187-    IF (QA_B == B.E. Q) AND
            (B% < (80% - DELTA))
            QA_B = PRI. Q
        DELAY 5MS
    }
```
~ 179

```
CONFIGURATION:
    QA_A: QUEUE ASSIGNMENT OF MAC ADDR A TRAFFIC
    QA_B: QUEUE ASSIGNMENT OF MAC ADDR B TRAFFIC
    LAST_QA_A: QA_A HISTORY
    LAST_QA_B: QA_B HISTORY
    LAST_QA_A = LAST_QA_B = PRI. Q
    FOREVER
    {
        GET QA_A, QA_B FROM POLICY ENFORCEMENT
        IF (QA_A != LAST_QA_A)
        {
            MOVE_VIRTUAL QUEUE (PORT1, MAC ADDR A, QA_A)
            LAST_QA_A = QA_A
        }
        IF (QA_A != LAST_QA_A)
        {
            MOVE_VIRTUAL QUEUE (PORT1, MAC ADDR A, QA_A)
            LAST_QA_A = QA_A
        }
        DELAY 2.5MS
    }
```
~ 180

DYNAMIC ASSIGNMENT OF TRAFFIC CLASSES TO A PRIORITY QUEUE IN A PACKET FORWARDING DEVICE

This Application is a continuation of U.S. patent application Ser. No. 09/227,389 filed Jan. 8, 1999, now abandoned.

FIELD OF THE INVENTION

The present invention relates to the field of telecommunications, and more particularly to dynamic assignment of traffic classes to queues having different priority levels.

BACKGROUND OF THE INVENTION

The flow of packets through packet-switched networks is controlled by switches and routers that forward packets based on destination information included in the packets themselves. A typical switch or router includes a number of input/output (I/O) modules connected to a switching fabric, such as a crossbar or shared memory switch. In some switches and routers, the switching fabric is operated at a higher frequency than the transmission frequency of the I/O modules so that the switching fabric may deliver packets to an I/O module faster than the I/O module can output them to the network transmission medium. In these devices, packets are usually queued in the I/O module to await transmission.

One problem that may occur when packets are queued in the I/O module or elsewhere in a switch or router is that the queuing delay per packet varies depending on the amount of traffic being handled by the switch. Variable queuing delays tend to degrade data streams produced by real-time sampling (e.g., audio and video) because the original time delays between successive packets in the stream convey the sampling interval and are therefore needed to faithfully reproduce the source information. Another problem that results from queuing packets in a switch or router is that data from a relatively important source, such as a shared server, may be impeded by data from less important sources, resulting in bottlenecks.

SUMMARY OF THE INVENTION

A method and apparatus for dynamic assignment of classes of traffic to a priority queue are disclosed. Bandwidth consumption by one or more types of packet traffic received in a packet forwarding device is monitored. The queue assignment of at least one type of packet traffic is automatically changed from a queue having a first priority to a queue having a second priority if the bandwidth consumption exceeds the threshold.

Other features and advantages of the invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which:

FIG. 3 illustrates the flow of a packet within the switch of FIG. 1;

FIG. 6 illustrates an example of dynamic assignment of traffic classes to a priority queue.

DETAILED DESCRIPTION

A packet forwarding device in which selected classes of network traffic may be dynamically assigned for priority queuing is disclosed. In one embodiment, the packet forwarding device includes a Java virtual machine for executing user-coded Java applets received from a network management server (NMS). A Java-to-native interface (JNI) is provided to allow the Java applets to obtain error information and traffic statistics from the device hardware and to allow the Java applets to write configuration information to the device hardware, including information that indicates which classes of traffic should be queued in priority queues. The Java applets implement user-specified traffic management policies based on real-time evaluation of the error information and traffic statistics to provide dynamic control of the priority queuing assignments. These and other aspects and advantages of the present invention are described below.

Figure 1:
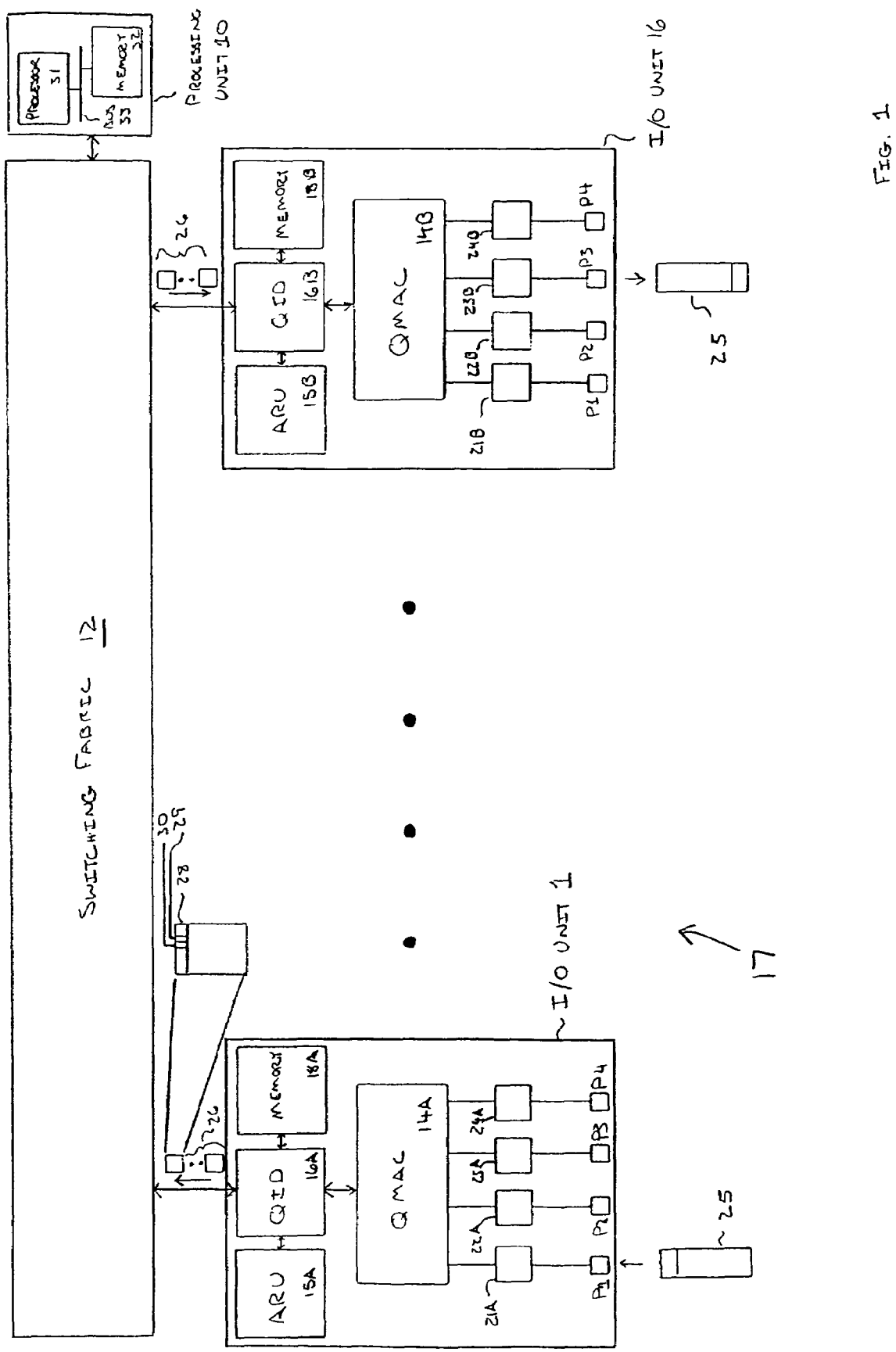
FIG. 1 illustrates a packet forwarding device that can be used to implement embodiments of the present invention.

FIG. 1 illustrates a packet forwarding device 17 that can be used to implement embodiments of the present invention. For the purposes of the present description, the packet forwarding device 17 is assumed to be a switch that switches packets between ingress and egress ports based on media access control (MAC) addresses within the packets. In an alternate embodiment, the packet forwarding device 17 may be a router that routes packets according to destination internet protocol (IP) addresses or a routing switch that performs both MAC address switching and IP address routing. The techniques and structures disclosed herein are applicable generally to a device that forwards packets in a packet switching network. Also, the term packet is used broadly herein to refer to a fixed-length cell, a variable length frame or any other information structure that is self-contained as to its destination address.

The switch 17 includes a switching fabric 12 coupled to a plurality of I/O units (only I/O units 1 and 16 are depicted) and to a processing unit 10. The processing unit includes at least a processor 31 (which may be a microprocessor, digital signal processor or microcontroller) coupled to a memory 32 via a bus 33. In one embodiment, each I/O unit 1, 16 includes four physical ports P1-P4 coupled to a quad media access controller (QMAC) 14A, 14B via respective transceiver interface units 21A-24A, 21B-24B. Each I/O unit 1, 16 also includes a quad interface device (QID) 16A, 16B, an address resolution unit (ARU) 15A, 15B and a memory 18A, 18B, interconnected as shown in FIG. 1. Preferably, the switch 17 is modular with at least the I/O units 1, 16 being implemented on port cards (not shown) that can be installed in a backplane (not shown) of the switch 17. In one implementation, each port card includes four I/O units and therefore supports up to 16 physical ports. The switch backplane includes slots for up to six port cards, so that the switch 17 can be scaled according to customer needs to support between 16 and 96 physical ports. In alternate embodiments, each I/O unit 1, 16 may support more or fewer physical ports, each port card may support more or fewer I/O units 1, 16 and the switch 17 may support more or fewer port cards. For example, the I/O unit 1 shown in FIG. 1 may be used to support four 10baseT transmission lines (i.e., 10 Mbps (mega-bit per second), twisted-pair) or four 100baseF transmission lines (100 Mbps, fiber optic), while a different I/O unit (not shown) may be used to support a single 1000baseF transmission line (1000 Mbps, fiber optic). Nothing disclosed herein should be construed as limiting embodiments of the present invention to use with a particular transmission medium, I/O unit, port card or chassis configuration.

Still referring to FIG. 1, when a packet 25 is received on physical port P1, it is supplied to the corresponding physical transceiver 21A which performs any necessary signal conditioning (e.g., optical to electrical signal conversion) and then forwards the packet 25 to the QMAC 14A. The QMAC 14A buffers packets received from the four physical transceivers 21A-24A as necessary, forwarding one packet at a time to the QID 16A. Receive logic within the QID 16A notifies the ARU 15A that the packet 25 has been received. The ARU computes a table index based on the destination MAC address within the packet 25 and uses the index to identify an entry in a forwarding table that corresponds to the destination MAC address. In packet forwarding devices that operate on different protocol layers of the packet (e.g., routers), a forwarding table may be indexed based on other destination information contained within the packet.

According to one embodiment, the forwarding table entry identified based on the destination MAC address indicates the switch egress port to which the packet 25 is destined and also whether the packet is part of a MAC-address based virtual local area network (VLAN), or a port-based VLAN. (As an aside, a VLAN is a logical grouping of MAC addresses (a MAC-address-based VLAN) or a logical grouping of physical ports (a port-based VLAN).) The forwarding table entry further indicates whether the packet 25 is to be queued in a priority queue in the I/O unit that contains the destination port. As discussed below, priority queuing may be specified based on a number of conditions, including, but not limited to, whether the packet is part of a particular IP flow, or whether the packet is destined for a particular port, VLAN or MAC address.

According to one embodiment, the QID 16A, 16B segments the packet 25 into a plurality of fixed-length cells 26 for transmission through the switching fabric 12. Each cell includes a header 28 that identifies it as a constituent of the packet 25 and that identifies the destination port for the cell (and therefore for the packet 25). The header 28 of each cell also includes a bit 29 indicating whether the cell is the beginning cell of a packet and also a bit 30 indicating whether the packet 25 to which the cell belongs is to be queued in a priority queue or a best effort queue on the destined I/O unit.

The switching fabric 12 forwards each cell to the I/O unit indicated by the cell header 28. In the exemplary data flow shown in FIG. 1, the constituent cells 26 of the packet 25 are assumed to be forwarded to I/O unit 16 where they are delivered to transmit logic within the QID 16B. The transmit logic in the QID 16B includes a queue manager (not shown) that maintains a priority queue and a best effort queue in the memory 18B. In one embodiment, the memory 18B is resolved into a pool of buffers, each large enough to hold a complete packet. When the beginning cell of the packet 25 is delivered to the QID 16B, the queue manager obtains a buffer from the pool and appends the buffer to either the priority queue or the best effort queue according to whether the priority bit 30 is set in the beginning cell. In one embodiment, the priority queue and the best effort queue are each implemented by a linked list, with the queue manager maintaining respective pointers to the head and tail of each linked list. Entries are added to the tail of the queue list by advancing the tail pointer to point to a newly allocated buffer that has been appended to the linked list, and entries are popped off the head of the queue by advancing the head pointer to point to the next buffer in the linked list and returning the spent buffer to the pool.

After a buffer is appended to either the priority queue or the best effort queue, the beginning cell and subsequent cells are used to reassemble the packet 25 within the buffer. Eventually the packet 25 is popped off the head of the queue and delivered to an egress port via the QMAC 14B and the physical transceiver (e.g., 23B) in an egress operation. This is shown by way of example in FIG. 1 by the egress of packet 25 from physical port P3 of I/O unit 16.

Figure 2A:
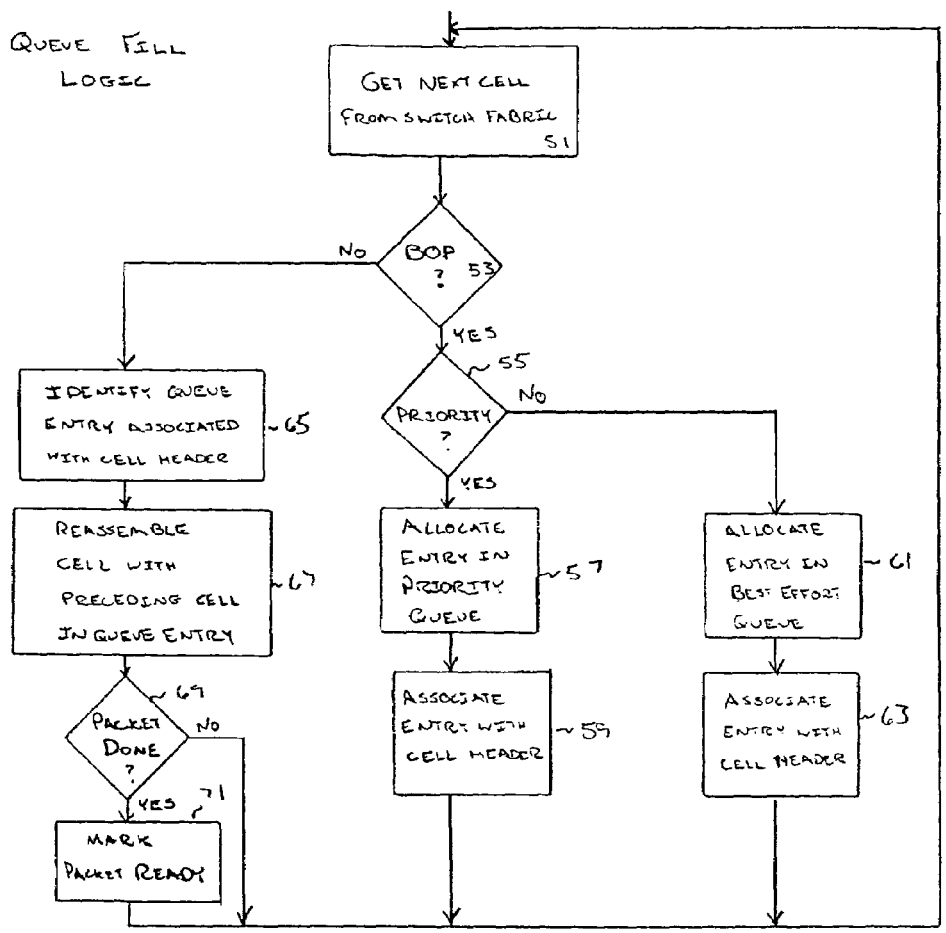
FIG. 2A illustrates queue fill logic implemented by a queue manager in a quad interface device.

FIG. 2A illustrates queue fill logic implemented by the queue manager in the QID. Starting at block 51, a cell is received in the QID from the switching fabric. The beginning cell bit in the cell header is inspected at decision block 53 to determine if the cell is the beginning cell of a packet. If so, the priority bit in the cell header is inspected at decision block 55 to determine whether to allocate an entry in the priority queue or the best effort queue for packet reassembly. If the priority bit is set, an entry in the priority queue is allocated at block 57 and the priority queue entry is associated with the portion of the cell header that identifies the cell as a constituent of a particular packet at block 59. If the priority bit in the cell header is not set, then an entry in the best effort queue is allocated at block 61 and the best effort queue entry is associated with the portion of the cell header that identifies the cell as a constituent of a particular packet at block 63.

Returning to decision block 53, if the beginning cell bit in the cell header is not set, then the queue entry associated with the cell header is identified at block 65. The association between the cell header and the queue entry identified at block 65 was established earlier in either block 59 or block 63. Also, identification of the queue entry in block 65 may include inspection of the priority bit in the cell to narrow the identification effort to either the priority queue or the best effort queue. In block 67, the cell is combined with the preceding cell in the queue entry in a packet reassembly operation. If the reassembly operation in block 67 results in a completed packet (decision block 69), then the packet is marked as ready for transmission in block 71. In one embodiment, the packet is marked by setting a flag associated with the queue entry in which the packet has been reassembled. Other techniques for indicating that a packet is ready for transmission may be used in alternate embodiments.

Figure 2B:
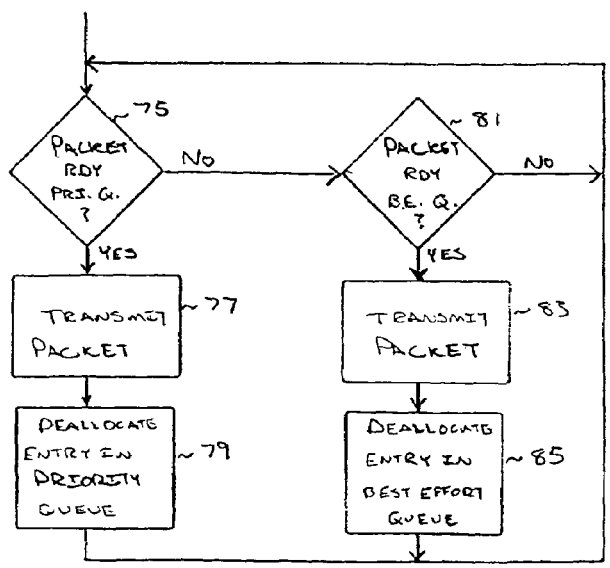
FIG. 2B illustrates queue drain logic according to one embodiment.

FIG. 2B illustrates queue drain logic according to one embodiment. At decision block 75, the entry at the head of the priority queue is inspected to determine if it contains a packet ready for transmission. If so, the packet is transmitted at block 77 and the corresponding priority queue entry is popped off the head of the priority queue and deallocated at block 79. If a ready packet is not present at the head of the priority queue, then the entry at the head of the best effort queue is inspected at decision block 81. If a packet is ready at the head of the best effort queue, it is transmitted at block 83 and the corresponding best effort queue entry is popped off the head of the best effort queue and deallocated in block 85. Note that, in the embodiment illustrated in FIG. 2B, packets are drained from the best effort queue only after the priority queue has been emptied. In alternate embodiments, a timer, counter or similar logic element may be used to ensure that the best effort queue 105 is serviced at least every so often or at least after every N number of packets are transmitted from the priority queue, thereby ensuring at least a threshold level of service to best effort queue.

FIG. 3 illustrates the flow of a packet within the switch 17 of FIG. 1. A packet is received in the switch at block 91 and used to identify an entry in a forwarding table called the address resolution (AR) table at block 93. At decision block 95, a priority bit in the AR table entry is inspected to determine whether the packet belongs to a class of traffic that has been selected for priority queuing. If the priority bit is set, the packet is segmented into cells having respective priority bits set in their headers in block 97. If the priority bit is not set, the packet is segmented into cells having respective priority bits cleared their cell headers in block 99. The constituent cells of each packet are forwarded to an egress I/O unit by the switching fabric. In the egress I/O unit, the priority bit of each cell is inspected (decision block 101) and used to direct the cell to an entry in either the priority queue 103 or the best effort queue 105 where it is combined with other cells to reassemble the packet.

Figure 4:
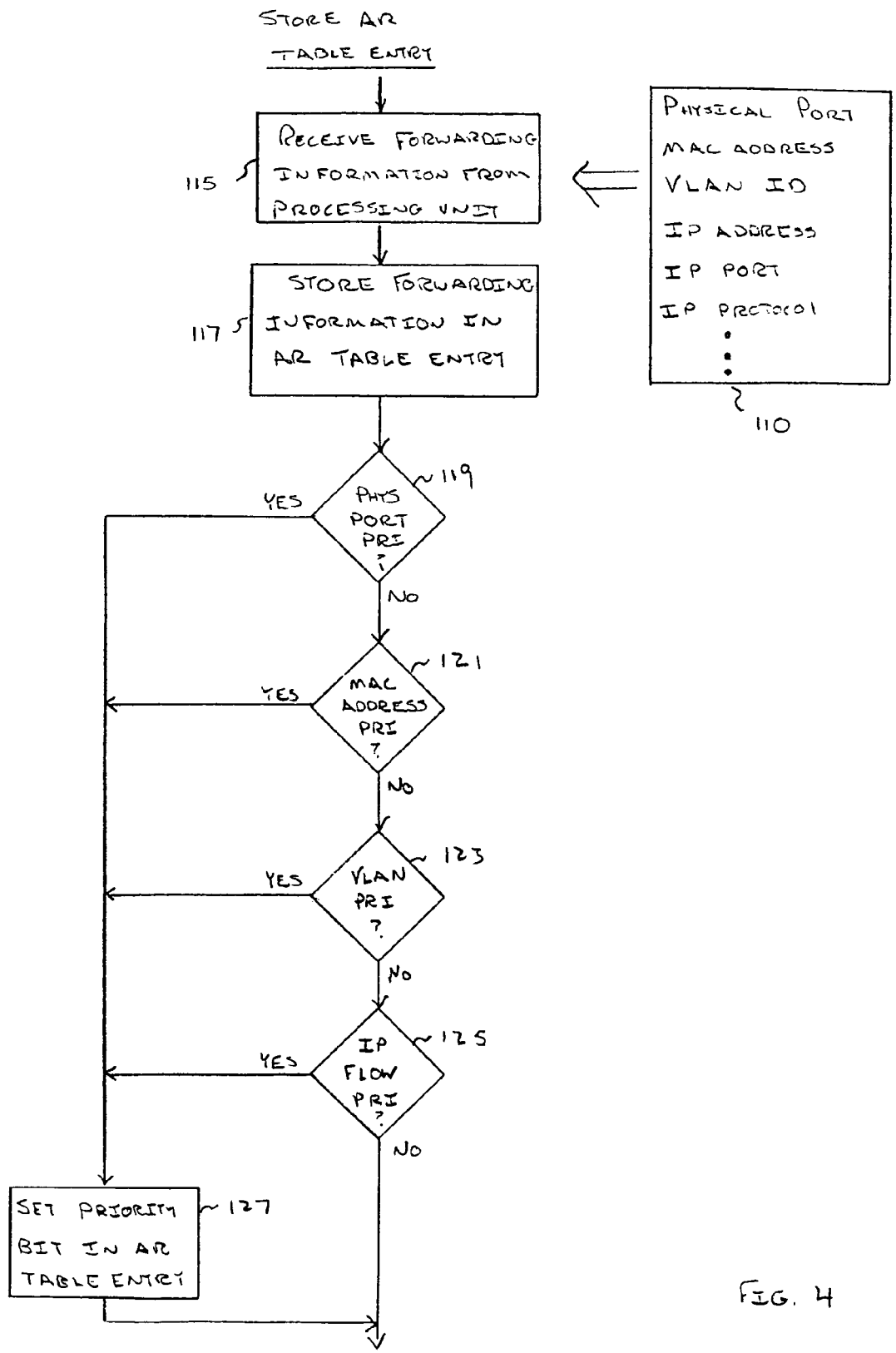
FIG. 4 illustrates storage of an entry in an address resolution table managed by an address resolution unit.

FIG. 4 illustrates storage of an entry in the address resolution (AR) table managed by the ARU. In one embodiment, the AR table is maintained in a high speed static random access memory (SRAM) coupled to the ARU. Alternatively, the AR table may be included in a memory within an application-specific integrated circuit (ASIC) that includes the ARU. Generally, the ARU stores an entry in the AR table in response to packet forwarding information from the processing unit. The processing unit supplies packet forwarding information to be stored in each AR table in the switch whenever a new association between a destination address and a switch egress port is learned. In one embodiment, an address-to-port association is learned by transmitting a packet that has an unknown egress port assignment on each of the egress ports of the switch and associating the destination address of the packet with the egress port at which an acknowledgment is received. Upon learning the association between the egress port and the destination address, the processing unit issues forwarding information that includes, for example, an identifier of the newly associated egress port, the destination MAC address, an identifier of the VLAN associated with the MAC address (if any), an identifier of the VLAN associated with the egress port (if any), the destination IP address, the destination IP port (e.g., transmission control protocol (TCP), universal device protocol (UDP) or other IP port) and the IP protocol (e.g., HTTP, FTP or other IP protocol). The source IP address, source IP port and source IP protocol may also be supplied to fully identify an end-to-end IP flow.

Referring to FIG. 4, forwarding information 110 is received from the processing unit at block 115. At block 117, the ARU stores the forwarding information in an AR table entry. At decision block 119, the physical egress port identifier stored in the AR table entry is compared against priority configuration information to determine if packets destined for the egress port have been selected for priority egress queuing. If so, the priority bit is set in the AR table entry in block 127. Thereafter, incoming packets that index the newly stored table entry will be queued in the priority queue to await transmission. If packets destined for the egress port have not been selected for priority queuing, then at decision block 121 the MAC address stored in the AR table entry is compared against the priority configuration information to determine if packets destined for the MAC address have been selected for priority egress queuing. If so, the priority bit is set in the AR table entry in block 127. If packets destined for the MAC address have not been selected for priority egress queuing, then at decision block 123 the VLAN identifier stored in the AR table entry (if present) is compared against the priority configuration information to determine if packets destined for the VLAN have been selected for priority egress queuing. If so, the priority bit is set in the AR table entry in block 127. If packets destined for the VLAN have not been selected for priority egress queuing, then at block 125 the IP flow identified by the IP address, IP port and IP protocol in the AR table is compared against the priority configuration information to determine if packets that form part of the IP flow have been selected for priority egress queuing. If so, the priority bit is set in the AR table entry, otherwise the priority bit is not set. Yet other criteria may be considered in assigning priority queuing in alternate embodiments. For example, priority queuing may be specified for a particular IP protocol (e.g., FTP, HTTP). Also, the ingress port, source MAC address or source VLAN of a packet may also be used to determine whether to queue the packet in the priority egress packet. More specifically, in one embodiment, priority or best effort queuing of unicast traffic is determined based on destination parameters (e.g., egress port, destination MAC address or destination IP address), while priority or best effort queuing of multicast traffic is determined based on source parameters (e.g., ingress port, source MAC address or source IP address).

Figure 5:
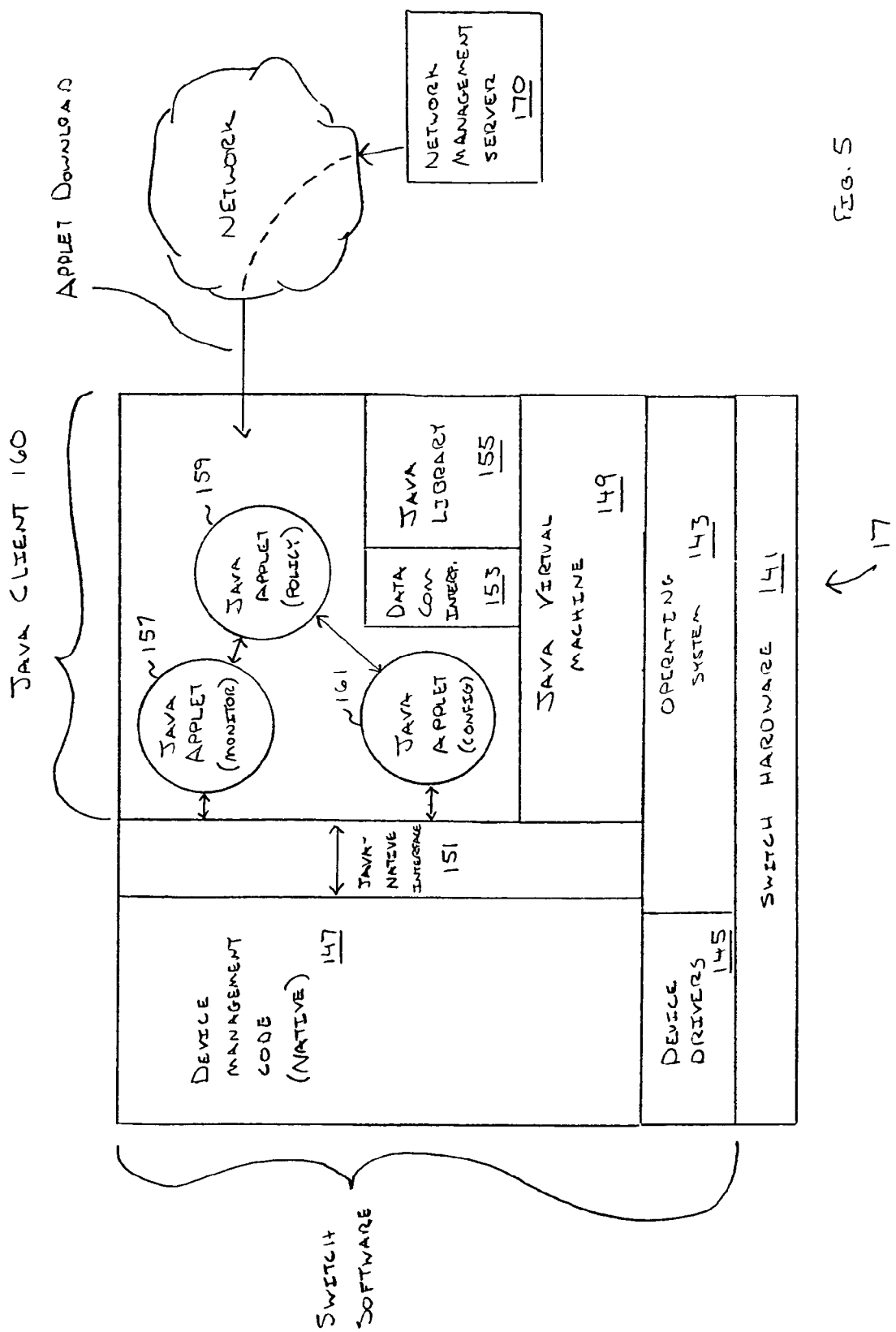
FIG. 5 is a diagram of the software architecture of the switch of FIG. 1 according to one embodiment.

FIG. 5 is a diagram of the software architecture of the switch 17 of FIG. 1 according to one embodiment. An operating system 143 and device drivers 145 are provided to interface with the device hardware 141. For example, device drivers are provided to write configuration information and AR storage entries to the ARUs in respective I/O units. Also, the operating system 143 performs memory management functions and other system services in response to requests from higher level software. Generally, the device drivers 145 extend the services provided by the operating system and are invoked in response to requests for operating system service that involve device-specific operations.

The device management code 147 is executed by the processing unit (e.g., element 10 of FIG. 1) to perform system level functions, including management of forwarding entries in the distributed AR tables and management of forwarding entries in a master forwarding table maintained in the memory of the processing unit. The device management code 147 also includes routines for invoking device driver services, for example, to query the ARU for traffic statistics and error information, or to write updated configuration information to the ARUs, including priority queuing information. Further, the device management code 147 includes routines for writing updated configuration information to the ARUs, as discussed below in reference to FIG. 6. In one implementation, the device management code 147 is native code, meaning that the device management code 147 is a compiled set of instructions that can be executed directly by a processor in the processing unit to carry out the device management functions.

In one embodiment, the device management code 147 supports the operation of a Java client 160 that includes a number of Java applets, including a monitor applet 157, a policy enforcement applet 159 and a configuration applet 161. A Java applet is an instantiation of a Java class that includes one or more methods for self initialization (e.g., a constructor method called "Applet( )"), and one or more methods for communicating with a controlling application. Typically the controlling application for a Java applet is a web browser executed on a general purpose computer. In the software architecture shown in FIG. 5, however, a Java application called Data Communication Interface (DCI) 153 is the controlling application for the monitor, policy enforcement and configuration applets 157, 159, 161. The DCI application 153 is executed by a Java virtual machine 149 to manage the download of Java applets from a network management server (NMS) 170. A library of Java objects 155 is provided for use by the Java applets 157, 159, 161 and the DCI application 153.

In one implementation, the NMS 170 supplies Java applets to the switch 17 in a hyper-text transfer protocol (HTTP) data stream. Other protocols may also be used. The constituent packets of the HTTP data stream are addressed to the IP address of the switch and are directed to the processing unit after being received by the I/O unit coupled to the NMS 170. After authenticating the HTTP data stream, the DCI application 153 stores the Java applets provided in the data stream in the memory of the processing unit and executes a method to invoke each applet. An applet is invoked by supplying the Java virtual machine 149 with the address of the constructor method of the applet and causing the Java virtual machine 149 to begin execution of the applet code. Program code defining the Java virtual machine 149 is executed to interpret the platform independent byte codes of the Java applets 157, 159, 161 into native instructions that can be executed by a processor within the processing unit.

According to one embodiment, the monitor applet 157, policy enforcement applet 159 and configuration applet 161 communicate with the device management code 147 through a Java-native interface (JNI) 151. The JNI 151 is essentially an application programming interface (API) and provides a set of methods that can be invoked by the Java applets 157, 159, 161 to send messages and receive responses from the device management code 147. In one implementation, the JNI 151 includes methods by which the monitor applet 157 can request the device management code 147 to gather error information and traffic statistics from the device hardware 141. The JNI 151 also includes methods by which the configuration applet 161 can request the device management code 147 to write configuration information to the device hardware 141. More specifically, the JNI 151 includes a method by which the configuration applet 161 can indicate that priority queuing should be performed for specified classes of traffic, including, but not limited to, the classes of traffic discussed above in reference to FIG. 4. In this way, a user-coded configuration applet 161 may be executed by the Java virtual machine 149 within the switch 17 to invoke a method in the JNI 151 to request the device management code 147 to write information that assigns selected classes of traffic to be queued in the priority egress queue. In effect, the configuration applet 161 assigns virtual queues defined by the selected classes of traffic to feed into the priority egress queue.

Although a Java virtual machine 149 and Java applets 157, 159, 161 have been described, other virtual machines, interpreters and scripting languages may be used in alternate embodiments. Also, as discussed below, more or fewer Java applets may be used to perform the monitoring, policy enforcement and configuration functions in alternate embodiments.

FIG. 6 illustrates an example of dynamic assignment traffic classes to a priority queue. An exemplary network includes switches A and B coupled together at physical ports 32 and 1, respectively. Suppose that a network administrator or other user determines that an important server 175 on port 2 of switch A requires a relatively high quality of service (QoS), and that, at least in switch B, the required QoS can be provided by ensuring that at least 20% of the egress capacity of switch B, port 1 is reserved for traffic destined to the MAC address of the server 175. One way to ensure that 20% egress capacity is reserved to traffic destined for the server 175 is to assign priority queuing for packets destined to the MAC address of the server 175, but not for other traffic. While such an assignment would ensure priority egress to the server traffic, it also may result in unnecessarily high bandwidth allocation to the server 175, potentially starving other important traffic or causing other important traffic to become bottlenecked behind less important traffic in the best effort queue. For example, suppose that there are at least two other MAC address destinations, MAC address A and MAC address B, to which the user desires to assign priority queuing, so long as the egress capacity required by the server-destined traffic is available. In that case, it would be desirable to dynamically configure the MAC address A and MAC address B traffic to be queued in either the priority queue or the best effort queue according to existing traffic conditions. In at least one embodiment, this is accomplished using monitor, policy enforcement and configuration applets that have been downloaded to switch B and which are executed in a Java client in switch B as described above in reference to FIG. 5.

FIG. 6 includes exemplary pseudocode listings of monitor, policy enforcement and configuration applets 178, 179, 180 that can be used to ensure that at least 20% of the egress capacity of switch B, port 1 is reserved for traffic destined to the server 175, but without unnecessarily denying priority queuing assignment to traffic destined for MAC addresses A and B. After initialization, the monitor applet 178 repeatedly measures of the port 1 line utilization from the device hardware. In one embodiment, the ARU in the I/O unit that manages port 1 keeps a count of the number of packets destined for particular egress ports, packets destined for particular MAC addresses, packets destined for particular VLANS, packets that form part of a particular IP flow, packets having a particular IP protocol, and so forth. The ARU also tracks the number of errors associated with these different classes of traffic, the number of packets from each class of traffic that are dropped, and other statistics. By determining the change in these different statistics per unit time, a utilization factor may be generated that represents the percent utilization of the capacity of an egress port, an I/O unit or the overall switch. Error rates and packet drop rates may also be generated.

In one embodiment, the monitor applet 178 measures line utilization by invoking methods in the JNI to read the port 1 line utilization resulting from traffic destined for MAC address A and for MAC address B every 10 milliseconds.

The policy enforcement applet 179 includes variables to hold the line utilization percentage of traffic destined for MAC address A (A%), the line utilization percentage of traffic destined for MAC address B (B%), the queue assignment (i.e., priority or best effort) of traffic destined for the server MAC address (QA_S), the queue assignment of traffic destined for MAC address A (QA_A) and the queue assignment of traffic destined for MAC address B. Also, a constant, DELTA, is defined to be 5% and the queue assignments for the MAC address A, MAC address B and server MAC address traffic are initially set to the priority queue.

The policy enforcement applet 179 also includes a forever loop in which the line utilization percentages A% and B% are obtained from the monitor applet 178 and used to determine whether to change the queue assignments QA_A and QA_B. If the MAC address A traffic and the MAC address B traffic are both assigned to the priority queue (the initial configuration) and the sum of the line utilization percentages A% and B% exceeds 80%, then less than 20% line utilization remains for the server-destined traffic. In that event, the MAC address A traffic is reassigned from the priority queue to the best effort queue (code statement 181). If the MAC address A traffic is assigned to the best effort queue and the MAC address B traffic is assigned to the priority queue, then the MAC address A traffic is reassigned to the priority queue if the sum of the line utilization percentages A% and B% drops below 80% less DELTA (code statement 183). The DELTA parameter provides a deadband to prevent rapid changing of priority queue assignment.

If the MAC address A traffic is assigned to the best effort queue and the MAC address B traffic is assigned to the priority queue and the line utilization percentage B% exceeds 80%, then less than 20% line utilization remains for the server-destined traffic. Consequently, the MAC address B traffic is reassigned from the priority queue to the best effort queue (code statement 185). If the MAC address B traffic is assigned to the best effort queue and the line utilization percentage B% drops below 80% less DELTA, then the MAC address B traffic is reassigned to the priority queue (code statement 187). Although not specifically provided for in the exemplary pseudocode listing of FIG. 6, the policy enforcement applet 179 may treat the traffic destined for the MAC A and MAC B addresses more symmetrically by including additional statements to conditionally assign traffic destined for MAC address A to the priority queue, but not traffic destined for MAC address B. In the exemplary pseudocode listing of FIG. 6, the policy enforcement applet 179 delays for 5 milliseconds at the end of each pass through the forever loop before repeating.

The configuration applet 180 includes variables, QA_A and QA_B, to hold the queue assignments of the traffic destined for the MAC addresses A and B, respectively. Variables LAST_QA_A and LAST_QA_B are also provided to record the history (i.e., most recent values) of the QA_A and QA_B values. The LAST_QA_A and LAST_QA_B variables are initialized to indicate that traffic destined for the MAC addresses A and B is assigned to the priority queue.

Like the monitor and policy enforcement applets 178,179, the configuration applet 180 includes a forever loop in which a code sequence is executed followed by a delay. In the exemplary listing of FIG. 6, the first operation performed by the configuration applet 180 within the forever loop is to obtain the queue assignments QA_A and QA_B from the policy enforcement applet 179. If the queue assignment indicated by QA_A is different from the queue assignment indicated by LAST_QA_A, then a JNI method is invoked to request the device code to reconfigure the queue assignment of the traffic destined for MAC address A according to the new QA_A value. The new QA_A value is then copied into the LAST_QA_A variable so that subsequent queue assignment changes are detected. If the queue assignment indicated by QA_B is different from the queue assignment indicated by LAST_QA_B, then a JNI method is invoked to request the device code to reconfigure the queue assignment of the traffic destined for MAC address B according to the new QA_B value. The new QA_B value is then copied into the LAST_QA_B variable so that subsequent queue assignment changes are detected. By this operation, and the operation of the monitor and policy enforcement applets 178, 179, traffic destined for the MAC addresses A and B is dynamically assigned to the priority queue according to real-time evaluations of the traffic conditions in the switch.

Although a three-applet implementation is illustrated in FIG. 6, more or fewer applets may be used in an alternate embodiment. For example, the functions of the monitor, policy enforcement and configuration applets 178, 179, 180 may be implemented in a single applet. Alternatively, multiple applets may be provided to perform policy enforcement or other functions using different queue assignment criteria. For example, one policy enforcement applet may make priority queue assignments based on destination MAC addresses, while another policy enforcement applet makes priority queue assignments based on error rates or line utilization of higher level protocols. Multiple monitor applets or configuration applets may similarly be provided.

Although queue assignment policy based on destination MAC address is illustrated in FIG. 6, myriad different queue assignment criteria may be used in other embodiments. For example, instead of monitoring and updating queue assignment based on traffic to destination MAC addresses, queue assignments may be updated on other traffic patterns, including traffic to specified destination ports, traffic from specified source ports, traffic from specified source MAC addresses, traffic that forms part of a specified IP flow, traffic that is transmitted using a specified protocol (e.g., HTTP, FTP or other protocols) and so forth. Also, queue assignments may be updated based on environmental conditions such as time of day, changes in network configuration (e.g., due to failure or congestion at other network nodes), error rates, packet drop rates and so forth. Monitoring, policy enforcement and configuration applets that combine many or all of the above-described criteria may be implemented to provide sophisticated traffic handling capability in a packet forwarding device.

Although dynamic assignment of traffic classes to a priority egress queue has been emphasized, the methods and apparatuses described herein may alternatively be used to assign traffic classes to a hierarchical set of queues anywhere in a packet forwarding device including, but not limited to, ingress queues and queues associated with delivering and receiving packets from the switching fabric. Further, although the queue assignment of traffic classes has been described in terms of a pair of queues (priority and best effort), additional queues in a prioritization hierarchy may be used without departing from the spirit and scope of the present invention.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. In a packet forwarding device, a method comprising:
   monitoring bandwidth consumption by one or more types of packet traffic received in the packet forwarding device comprising determining a measure of bandwidth consumption in the packet forwarding device due to traffic associated with a physical port on the forwarding device;
   determining whether the bandwidth consumption by the one or more types of packet traffic exceeds a threshold; and
   automatically changing assignment of at least one type of packet traffic of the one or more types of packet traffic from a queue having a first priority to a queue having a second priority if the bandwidth consumption computed based on an evaluation of traffic statistics substantially in real-time exceeds the threshold, the traffic statistics include at least one of (i) a number of packets destined for particular egress ports, (ii) a number of packets destined for particular MAC addresses, (iii) a number of packets destined for a particular virtual local area network, (iv) a number of packets having a particular IP protocol, (v) a number of errors associated with different classes of traffic, and (vi) a number of packets from each class of traffic that are dropped.

2. The method of claim 1 further comprising receiving program code in the packet forwarding device after installation of the packet forwarding device in a packet communications network and wherein said monitoring, determining and automatically changing is implemented by the executing program code.

3. The method of claim 2 wherein receiving the program code comprises receiving a sequence of virtual machine instructions and wherein executing the program code comprises executing the sequence of virtual machine instructions using a virtual machine included in the packet forwarding device.

4. The method of claim 3 wherein receiving the sequence of virtual machine instructions comprises receiving a sequence of Java byte codes and wherein executing the sequence of virtual machine instructions using a virtual machine comprises executing the sequence of Java byte codes in a Java virtual machine included in the packet forwarding device.

5. In a packet forwarding device, a method comprising:
monitoring bandwidth consumption by one or more types of packet traffic received in the packet forwarding device comprising determining a measure of bandwidth consumption in the packet forwarding device due to traffic associated with a particular network address;
determining whether the bandwidth consumption by the one or more types of packet traffic exceeds a threshold; and
automatically changing assignment of at least one type of packet traffic of the one or more types of packet traffic from a queue having a first priority to a queue having a second priority if the bandwidth consumption computed based on an evaluation of traffic statistics substantially in real-time exceeds the threshold, the traffic statistics include at least one of (i) a number of packets destined for particular egress ports, (ii) a number of packets destined for particular MAC addresses, (iii) a number of packets destined for a particular virtual local area network, (iv) a number of packets having a particular IP protocol, (v) a number of errors associated with different classes of traffic, and (vi) a number of packets from each class of traffic that are dropped.

6. The method of claim 5 wherein the determining a measure of bandwidth consumption in the packet forwarding device due to traffic associated with the particular network address comprises determining a measure of bandwidth consumption due to traffic associated with a particular media access control (MAC) address.

7. In packet forwarding device, a method comprising:
monitoring bandwidth consumption by one or more types of packet traffic received in the packet forwarding device comprising determining a measure of bandwidth consumption in the packet forwarding device due to traffic associated with a particular communications protocol;
determining whether the bandwidth consumption by the one or more types of packet traffic exceeds a threshold; and
automatically changing assignment of at least one type of packet traffic of the one or more types of packet traffic from a queue having a first priority to a queue having a second priority if the bandwidth consumption computed based on an evaluation of traffic statistics substantially in real-time exceeds a threshold, the traffic statistics include at least one of (i) a number of packets destined for particular egress ports, (ii) a number of packets destined for particular MAC addresses, (iii) a number of packets destined for a particular virtual local area network, (iv) a number of packets having a particular IP protocol, (v) a number of errors associated with different classes of traffic, and (vi) a number of packets from each class of traffic that are dropped.

8. The method of claim 7 wherein the determining a measure of bandwidth consumption in the packet forwarding device due to traffic associated with the particular communications protocol comprises determining a measure of bandwidth consumption in the packet forwarding device due to traffic associated with at least one of the following protocols: file transfer protocol (FTP), hyper-text transfer protocol (HTTP), transmission control protocol/internet protocol (TCP/IP).

9. A packet forwarding apparatus comprising:
a plurality of input/output (I/O) ports to transmit and receive packets of information;
first and second queues to buffer the packets prior to transmission via one or more of the I/O ports, packets buffered in the first queue having higher transmission priority than packets buffered in the second queue;
queue assignment logic to assign the packets to be buffered in either the first queue or the second queue according to a packet type associated with each packet, each of the packets being associated with at least one of a plurality of packet types; and
one or more agents to monitor bandwidth consumption by packets associated with a first packet type of the plurality of packet types and to automatically change assignment of packets associated with the first packet type from the first queue to the second queue if bandwidth consumption of packets associated with the first packet type and computed based on an evaluation of traffic statistics substantially in real-time exceeds the threshold, the traffic statistics include at least one of (i) a number of packets destined for particular egress ports, (ii) a number of packets destined for particular MAC addresses, (iii) a number of packets destined for a particular virtual local area network, (iv) a number of packets having a particular IP protocol, (v) a number of errors associated with different classes of traffic, and (vi) a number of packets from each class of traffic that are dropped.

10. The apparatus of claim 9 further comprising:
a processing unit coupled to the plurality of I/O ports, the processing unit including a memory and a processor; and
a data communications interface to receive program code in the memory of processing unit after installation of the packet forwarding apparatus in a packet communications network and wherein the one or more agents are implemented by execution of the program code in the processor of the processing unit.

11. The apparatus of claim 10 wherein the packet forwarding apparatus further comprises program code that, when executed by the processing unit, implements a virtual machine, and wherein the program code received via the data communications interface comprises a sequence of instructions that is executed by the virtual machine to implement one or more agents.

12. The apparatus of claim 11 wherein the program code received via the data communications interface includes a sequence of Java byte codes and wherein the virtual machine is a Java virtual machine.

13. The apparatus of claim 9 wherein the first packet type comprises packets associated with a particular one of the I/O ports.

14. The apparatus of claim 9 wherein the first packet type comprises packets comprises packets associated with a particular network address.

15. The apparatus of claim 14 wherein the particular network address is a particular media access control (MAC) address.

16. The apparatus of claim 9 wherein the first packet type comprises packets comprises packets associated with a particular communications protocol.

17. The apparatus of claim 16 wherein the particular communications protocol is a hyper-text transfer protocol (HTTP).

18. The apparatus of claim 16 wherein the particular communications protocol is a file transfer protocol (FTP).

19. The apparatus of claim 9 wherein the packet forwarding apparatus is a switch.

20. A communications network comprising a packet forwarding device, the packet forwarding device including:
a plurality of input/output (I/O) ports to transmit and receive packets of information from one or more other devices in the communications network;
a processing unit coupled to the plurality of I/O ports, the processing unit including a memory and a processor;
first and second queues to buffer the packets prior to transmission via one or more of the I/O ports, packets buffered in the first queue having higher transmission priority than packets buffered in the second queue;
queue assignment logic implemented within the memory and executed by the processor to assign the packets to be buffered in either the first queue or the second queue according to a packet type associated with each packet, each of the packets being associated with at least one of a plurality of packet types; and
one or more applets implemented within the memory for execution in order to monitor bandwidth consumption by packets associated with a first packet type of the plurality of packet types and to automatically change assignment of packets associated with the first packet type from the first queue to the second queue if bandwidth consumption of packets associated with the first packet type and computed based on an evaluation of traffic statistics substantially in real-time exceeds a threshold, the traffic statistics include at least one of (i) a number of packets destined for particular egress ports, (ii) a number of packets destined for particular MAC addresses, (iii) a number of packets destined for a particular virtual local area network, (iv) a number of packets having a particular IP protocol, (v) a number of errors associated with different classes of traffic, and (vi) a number of packets from each class of traffic that are dropped.

21. The communications network of claim 20 wherein the packet forwarding device further includes program code that, when executed by the processing unit, implements a virtual machine that interprets the one or more applets into instructions executable by the processor.

22. The communications network of claim 20 wherein the packet forwarding device is a switch.

23. In a packet forwarding device, a method comprising:
monitoring an error rate associated with one or more types of packet traffic received in the packet forwarding device;
determining whether the error rate associated with the one or more types of packet traffic exceeds a threshold; and
automatically changing assignment of at least one type of packet traffic of the one or more types of packet traffic from a queue having a first priority to a queue having a second priority if the error rate computed based on an evaluation of error information substantially in real-time exceeds the threshold, the error information includes at least one of (i) a number of errors associated with the one of more types of traffic, and (ii) a number of packets from each types of traffic that are dropped.

* * * * *